J. O. KAFADER.
COTTER PIN.
APPLICATION FILED FEB. 24, 1916.
1,190,908.
Patented July 11, 1916.
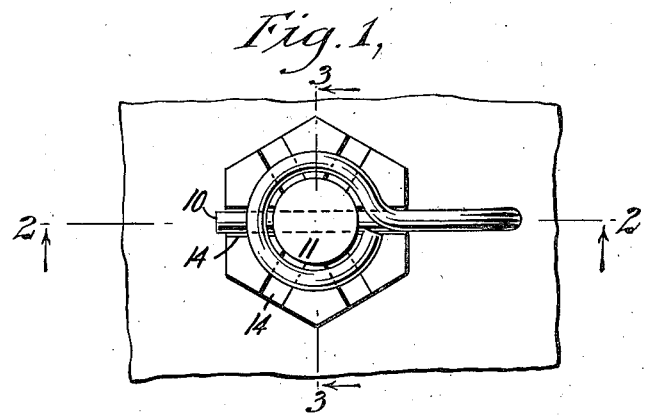
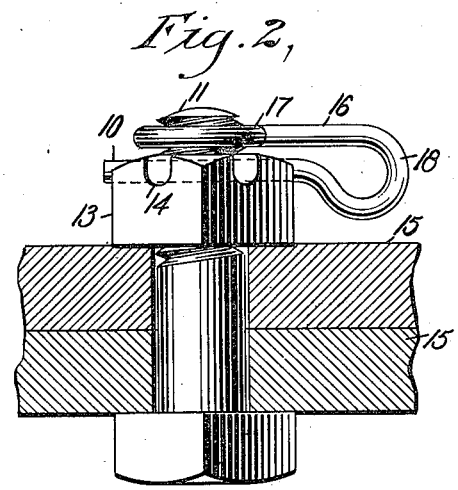
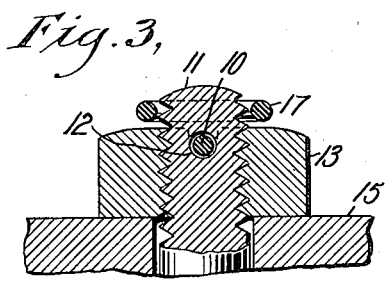
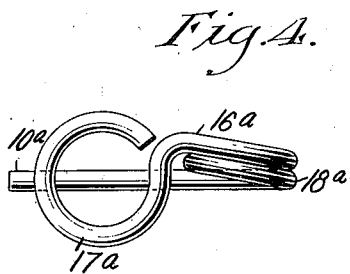
WITNESSES
INVENTOR
James O. Kafader
BY
ATTORNEYS

UNITED STATES PATENT OFFICE.

JAMES OLIVER KAFADER, OF FORT BIDWELL, CALIFORNIA.

COTTER-PIN.

1,190,908.

Specification of Letters Patent.

Patented July 11, 1916.

Application filed February 24, 1916. Serial No. 80,152.

*To all whom it may concern:*

Be it known that I, JAMES O. KAFADER, a citizen of the United States, and a resident of Fort Bidwell, in the county of Modoc and State of California, have invented a new and Improved Cotter-Pin, of which the following is a full, clear, and exact description.

My invention relates more particularly to a cotter pin designed for use in connection with bolts and nuts, the object being to provide a pin having improved self-locking means possessing advantages over the usual split cotter pins.

My invention has largely in view to provide a cotter pin especially useful on automobiles for securely locking the nuts, and which may be applied to the bolts and nuts and removed therefrom with convenience and despatch.

The invention will be particularly explained in the specific description following.

Reference is to be had to the accompanying drawings forming a part of this specification in which similar reference characters indicate corresponding parts in all the views.

Figure 1 is a plan view of a cotter pin embodying my invention, showing the same in use; Fig. 2 is a side elevation with clamped parts in section, on the line 2—2, Fig. 1; Fig. 3 is a section on the line 3—3, Fig. 1; Fig. 4 is a plan view of a slightly different form of cotter pin.

My improved cotter pin includes an unsplit shank or pin proper 10, of a length to be passed through a nut and bolt. The bolt 11 is formed with a transverse pin-hole 12 and the nut 13 is formed in the outer face thereof with a series of radial depressions 14 extending from the opening or bore of the nut to the exterior. At 15, I have shown conventionally, two members to be clamped by the bolt and nut.

In order to provide the pin 10 with an integral self-locking means, the material of the pin is returned on itself forming an arm 16 which terminates at its free end in a bolt-eye 17, which, preferably, is of circular form and of a size to be passed over the free end of the bolt outside of the nut 13 after the latter has been placed on the bolt 11. At the juncture of the locking arm 16 and the body of the pin 10, a spring bend 18 is produced.

With a cotter pin formed as described, the nut is positioned on the bolt 11 so that opposite grooves or depressions 14 will be in register with the pin-hole 12 of the bolt and the pin 10 is passed through said registering depressions and pin-hole. The resiliency of the fastener arm 16, due to the spring bend 18, normally tends to maintain the locking eye 17 adjacent to the pin 10, and in inserting the pin, the spring arm is raised or sprung away from the pin 10 sufficiently to permit the pin to be positioned in the nut and bolt; upon the arm 16 being relaxed the locking eye 17 will pass over the bolt 11, preventing accidental displacement of the pin.

In the form shown in Fig. 4, the pin $10^a$ corresponds with the pin 10 and the locking eye $17^a$ corresponds with the similar eye 17. The returned locking arm $16^a$ in which the eye $17^a$ is formed, is joined to the pin $10^a$ by a complete coil $18^a$ instead of a single bend as at 18 in order to increase the resiliency of the locking arm.

Having thus described my invention I claim as new and desire to secure by Letters Patent:

A cotter pin formed of a length of material returned on itself to present a locking arm, the said locking arm having an eye formed at its free end adapted to be passed over a bolt, there being a resilient formation joining the said pin and locking arm.

In testimony whereof I have signed my name to this specification in the presence of two subscribing witnesses.

JAMES OLIVER KAFADER.

Witnesses:
ADAM A. RODGERS,
C. D. KAFADER.